United States Patent [19]

Malcolm

[11] Patent Number: 5,684,991
[45] Date of Patent: Nov. 4, 1997

[54] MODIFICATION METADATA SET, ABSTRACTED FROM DATABASE WRITE REQUESTS

[75] Inventor: Peter Bryan Malcolm, Lewdown, United Kingdom

[73] Assignee: Cheyenne Advanced Technology Ltd., United Kingdom

[21] Appl. No.: 598,047

[22] Filed: Feb. 7, 1996

Related U.S. Application Data

[63] Continuation of Ser. No. 165,382, Dec. 10, 1993, abandoned.

[51] Int. Cl.⁶ .................................................... G06F 17/30
[52] U.S. Cl. ................... 395/620; 395/617; 395/182.04
[58] Field of Search ................... 395/617, 620, 395/182.04

[56] References Cited

U.S. PATENT DOCUMENTS

| | | | |
|---|---|---|---|
| 4,507,751 | 3/1985 | Gawlick et al. | 364/900 |
| 4,646,229 | 2/1987 | Boyle | 395/600 |
| 4,686,620 | 8/1987 | Ng | 364/200 |
| 5,043,871 | 8/1991 | Nishigaki et al. | 395/600 |
| 5,086,502 | 2/1992 | Malcolm | 395/575 |
| 5,163,148 | 11/1992 | Walls et al. | 395/600 |
| 5,204,958 | 4/1993 | Cheng et al. | 395/600 |
| 5,251,316 | 10/1993 | Anick et al. | 395/600 |
| 5,276,860 | 1/1994 | Fortier et al. | 395/575 |
| 5,278,979 | 1/1994 | Foster et al. | 395/600 |
| 5,347,653 | 9/1994 | Flynn et al. | 395/600 |
| 5,434,994 | 7/1995 | Shaheen et al. | 395/617 |
| 5,452,448 | 9/1995 | Sakuraba et al. | 395/617 |

FOREIGN PATENT DOCUMENTS

| | | | |
|---|---|---|---|
| 0 566 966 | 10/1993 | European Pat. Off. | G06F 11/14 |
| 2 136 175 | 9/1984 | United Kingdom | G06F 15/00 |
| WO 91/01026 | 1/1991 | WIPO | G06F 15/40 |

OTHER PUBLICATIONS

Kane et al., "The Best Computer 843,000 Can Buz", PC Magazine, vol. 9, No. 7, Apr. 10, 1990, pp. 233–245.
Albert Alderson, "A Space-Efficient Technique For Recording Versions of Data", *Software Engineering Journal*, vol. 3, No. 6, Nov., 1988, pp. 240–246.

*Primary Examiner*—Thomas G. Black
*Assistant Examiner*—Paul R. Lintz
*Attorney, Agent, or Firm*—Fish & Richardson P.C.

[57] ABSTRACT

In a microprocessor-based computer system, file backups are performed by monitoring modified areas of one or more files, through the write statements which give rise to the modifications. A meta-data database is constructed containing information relating to the locations of those modified areas. The backup database may then be modified by interrogating the meta-data database and thereby backing up only the data which has been modified in the database itself. Thus the size of the backup database may be reduced. The invention may be incorporated in a dedicated backup application and/or operating system or may interact with a conventional file-by-file backup application.

32 Claims, 2 Drawing Sheets

MODIFICATION METADATA SET, ABSTRACTED FROM DATABASE WRITE REQUESTS

This is a continuation of application Ser. No. 08/165,382, filed Dec. 10, 1993, now abandoned.

BACKGROUND OF THE INVENTION

This invention relates to a method of operating a computer system and in particular to a method of providing backup copies of data to guard against data becoming corrupted or lost. The invention is particularly concerned with the provision of backups for personal computers (PCs).

Using current computer systems, the smallest entity that can be backed up is a single complete file. As long as a file to be backed up is fairly small such as a word-processing file, for example, then this limitation presents little problem. However, a large multi-user database may have large files often being larger than 1 Gigabyte. Currently, a fast tape drive is capable of a sustained data transfer rate of about 20 Megabytes/minute. A 1 Gigabyte file therefore takes a minimum of 51.2 minutes to back up. If backup copies of the database are to be kept up to date then a single change in this file means that the whole file must backed up. Furthermore, whilst the backup is in progress, no other user can modify the file without rendering the backup useless. Even if data is backed up overnight, for example, typically the backup window will only be 12 hours long which is sufficient for 14 Gigabytes to be backed up at these transfer rates and this is assuming that a tape drive having an autochanger for replacing full tapes is available.

Large-scale file servers have already reached the point where the length of backup window is insufficient and/or the volume of data to be backed up is too great for a conventional backup system having only one tape drive. The current approach to this problem is to build faster tape drives typically by streaming data to two or more tape drives in parallel. However, the technical limitations of tape drive mechanisms suggest that at least in the near future, data rates exceeding 1 to 2 Megabytes/second and approaching those of hard disk systems are unlikely to be attainable. Since technical developments in storage systems are producing a rate of increase in hard disk capacity which exceeds that of the increase in tape drive data transfer rates, the problem of backing up large quantities of data will not be solved by building faster tape drives and a different solution is required.

SUMMARY OF THE INVENTION

The present invention provides a backup system which reduces the size of the smallest entity that can be backed up thereby reducing the overall volume of data to be backed up.

According to a first aspect of the invention, a method of operating a microprocessor-based computer system including a random access memory, a central processing unit and storage means, comprises the step of providing instructions stored in said memory to said central processing unit to cause said central processing unit to write data periodically to at least one file stored in the storage means by generating a write request, wherein the write request comprises a modification data set which represents an area of said file modified by said write request, and wherein the modification data set includes identification means for identifying said file, a starting position in said file and a length value corresponding to the quantity of data to be written to said file, the method further comprising the steps of extracting said modification data set from each said write request, and building a database containing at least one said modification data set.

Preferably, the database is optimised by analysing the data sets to establish whether any of them relate to the same or similar areas of the same file. If the database contains data sets relating to the same area then only the latest one is relevant and earlier ones can be discarded. If several data sets relate to partially overlapping or contiguous areas then they may be concatenated into a single data set covering the total area formerly covered by the several data sets. In this way, the size of the data base may be reduced and the number of accesses to a particular file during backing up and restoring may be reduced.

The database, once created, contains a record of all modified areas of files modified since the last database was created (probably since the last backup depending whether incremental, differential or full backups are being performed). The database may be interrogated to establish which areas of which files have been modified and this information may then be used to permit the backing up of only modified areas of a file rather than the whole file.

In order to perform a backup using a conventional file-by-file backup application, a modification file is preferably created which contains the contents of the database and the data from the areas of the files referred to in the database. This file may then be backed up using a conventional backup application program.

Alternatively, the modification file may not actually exist as a file saved on the storage means but may instead be simulated in such a way that the backup application interacts with it as if it is a file which does exist. This technique can be used to save time and/or storage space on the storage means.

A first preferred technique for simulating the modification file is to create a file on the storage means that is the same size as the modification file will be when it contains the database and the associated areas of modified files. The simulated file contains redundant information and is only provided as an entity with which the backup application interacts as if it was a file of that size. Read requests from the backup application are monitored and when the application attempts to read the simulated file, the data requested by the application is generated in real time and passed to the application instead of data from the file on the storage means. In this way, time is saved by not needing to write the modification file to the storage means and subsequently reading it back to pass it to the backup application.

A second preferred technique is to monitor directory read requests from the backup application and to add details of the simulated modification file to the information returned by the operating system in such a way that the directory appears to include the modification file although no such file exists. When the backup application attempts to read the file, data is substituted in the same way as in the first technique. This technique saves space on the storage means by not requiring a file to be created on the storage means at all.

The method may be incorporated in an independent program which interacts with a separate operating system and/or backup application or it may form an integral part of one or both of these.

The method preferably includes a restoration phase which may be implemented as an independent program or as an integral part of an operating system and/or a backup application. The restoration phase may comprise the reading of a backed up modification file and the subsequent writing of backed up data to appropriate areas of files according to the modification data sets backed up as part of the modification file.

According to a second aspect of the invention, a microprocessor-based computer system including a random access memory, a central processing unit and storage means, the system comprising means for providing instructions stored in said memory to said central processing unit to cause said central processing unit to write data periodically to at least one file stored in the storage means by generating a write request, wherein the write request comprises a modification data set which represents an area of said file modified by said write request, and wherein the modification data set includes identification means for identifying said file, a starting position in said file and a length value corresponding to the quantity of data to be written to said file, the system further comprising means for extracting said modification data set from each said write request, and building a database containing at least one said modification data set.

The invention will now be described by way of example, with reference to the drawings:

DESCRIPTION OF THE PREFERRED EMBODIMENT OF THE INVENTION

Figure 1:
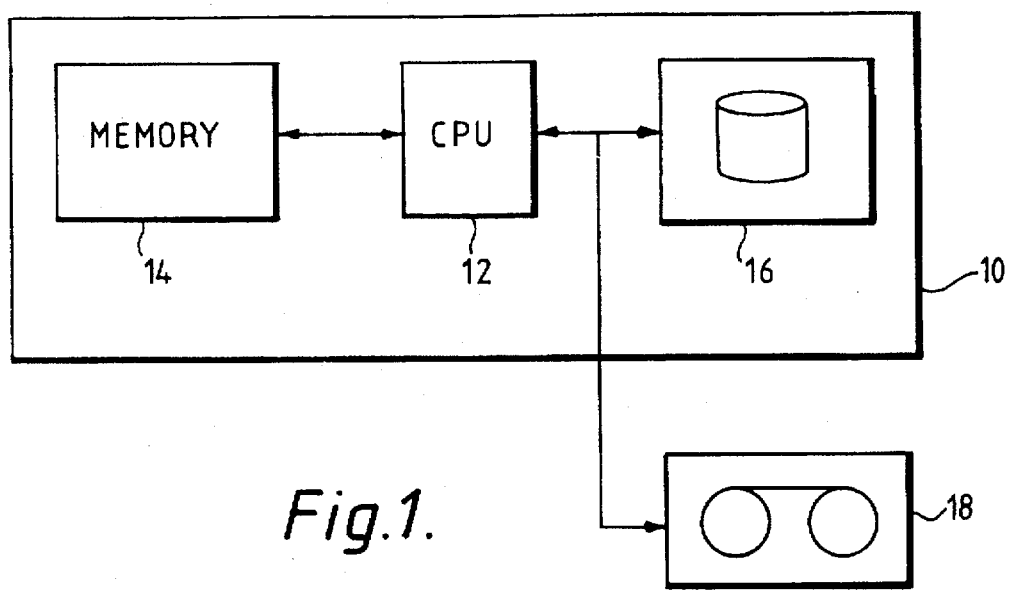
FIG. 1 is a block diagram of a personal computer and a tape drive.

With reference to FIG. 1 of the drawings, a personal computer 10 typically comprises a central processing unit 12, a random access memory 14, and a storage device in the form of a hard disk drive 16. In this example, for the purpose of providing backup storage means, a tape unit 18 is coupled to the computer 10.

In order to reduce the volume of data that is required to be backed up on such a system, the size of the smallest entity that can be backed up (currently a single file) is reduced.

Currently, all file by file backup applications rely on the computer operating system to record which areas of the file system have been modified, and hence which areas require backing up. In all present PC and Local Area Network (LAN) based operating systems, information relating to modified files is provided using a so-called "archive" flag associated with each file which is set when the file is modified. Each operating system also provides means by which the flag may be cleared when the file has been backed up.

In a preferred embodiment of the invention, means are provided for identifying particular areas of a file that have been modified rather than a whole file. In this way a backup may be performed which is more efficient in its usage of backup storage capacity and time.

Figure 2A:
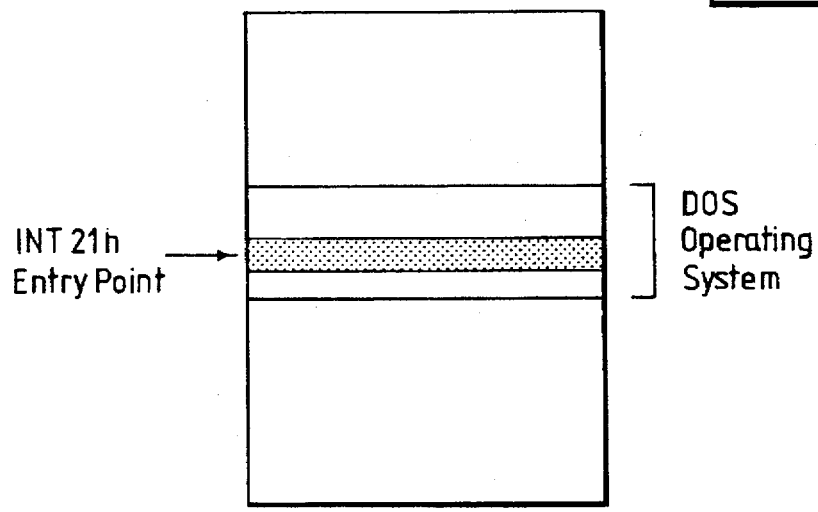
FIGS. 2A and 2B are diagrams illustrating a system memory map at the operating system level of a conventional personal computer and a computer modified to operate in accordance with the method of the invention respectively.
Figure 2B:
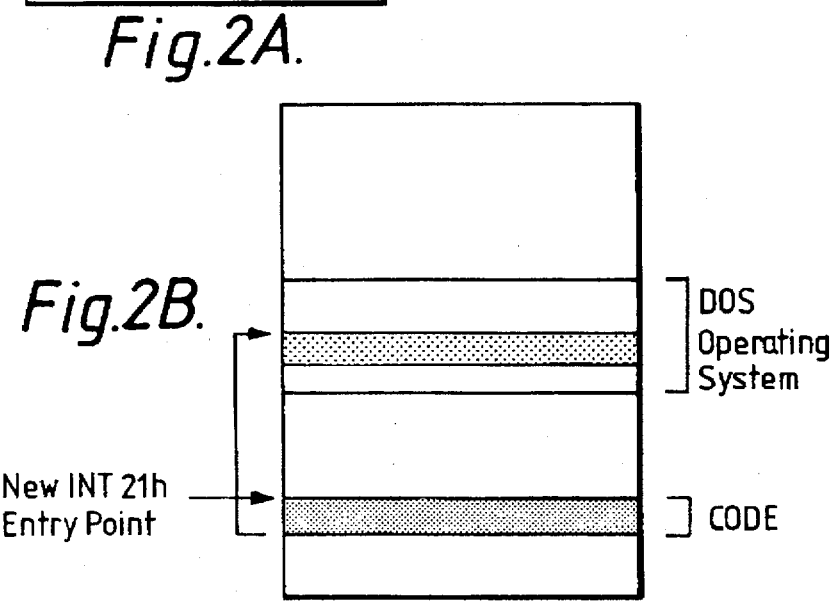

In a preferred embodiment, the system does not form part of an operating system or backup application. Once the system has been activated to record modifications to files or a particular subset of files, calls to the operating system to write to files are intercepted. With reference to FIGS. 2A and 2B, whenever a program wishes to access a file it calls a standard routine which writes data to the disk. This routine, which in the case of the DOS operating system is known as Interrupt 21 hex (INT21 h), is an integral part of the operating system. The action performed by the routine depends on the parameters passed to the routine upon entry. This routine is shown in FIG. 2A as INT21 h forming part of the operating system in a system memory map, the INT21 h entry point being shown by an arrow. To carry out a preferred method in accordance with the invention, additional program code is added at the operating system interface level as shown in FIG. 2B. In practice, in a DOS environment, this can be loaded into the computer as a device driver using the CONFIG.SYS file.

The added software has the effect of an instruction to write data being replaced or supplemented by an alternative set of instructions. A similar technique may be used to intercept an instruction to read data from the disk and to replace or supplement this also with an alternative set of instructions.

Figure 3:
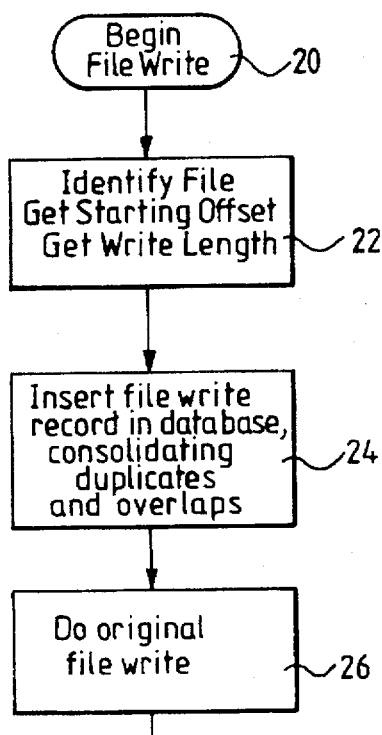
FIG. 3 is a flowchart of a file write process in accordance with the invention.

With reference to the flowchart of FIG. 3, when an application performs step 20 to write data to a file, this is intercepted at the operating system interface level and steps 22 and 24 are inserted before the file write requested by the application is performed in step 26.

In step 22, using the information passed to the operating system as part of step 20, the file to be written to is identified and a modification data set comprising the starting point or offset and the length of write are extracted. This data set uniquely identifies an area of a particular file. In step 24, this data set is stored in a database. Control is then passed back to the write routine so that the write operation requested by the application is performed in the normal way (step 26). This sequence is repeated for each write request received by the operating system. In this way a database is constructed which contains a record of the location of all modified areas of files (although not of the data actually written to the files).

If the database is suitably indexed, step 24 may also include a consolidation operation which ensures that the database does not contain out of date information. For example, there is little point in the database retaining a modification data set relating to an area of a file that has subsequently been overwritten. Earlier data sets are therefore discarded. Similarly if several modification data sets relate to overlapping areas of a file, these may be concatenated into a single modification data set relating to the total area associated with the several data sets. The several data sets may then be discarded. Furthermore, the data sets may be ordered so that they form a sequential list related, for example, to the order of storage of the files on the storage means.

Since only the location of modifications and not the modifications themselves are stored in the database, the impact on the performance of the computer system is minimal.

Having established the database, there are several ways of backing up the areas represented by it.

Figure 4:
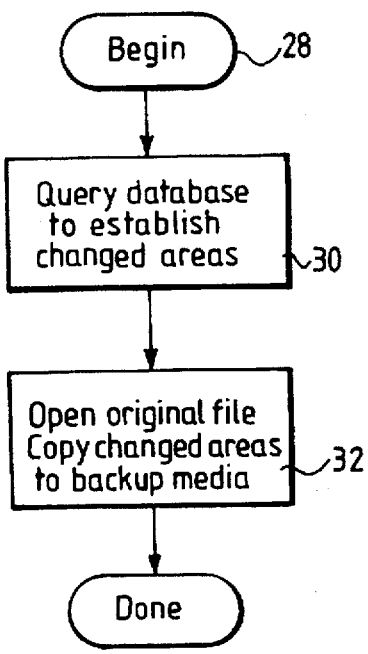
FIG. 4 is a flowchart of a backup process in accordance with a first embodiment of the invention.

In a first embodiment, a dedicated backup application is written or modified to take account of the database created according to the flowchart of FIG. 3. The operation of this arrangement is shown in FIG. 4.

In step 28, the backup process is begun. In step 30, the backup application interrogates or queries the database to establish which areas of which files have changed. At this point, the backup application may filter out those files which it is not wished to backup according, for example, to whether a particular file is included in a list or directory structure which has previously been specified by the user, in a conventional manner.

In step 32, a file which has been identified as modified is opened and the data in the modified area identified by the database is copied to the backup media 18. Steps 30 and 32 are repeated until all files recorded in the database have been considered by the backup application and the modified areas recorded on the backup media 18. In addition to the data from the files, a copy of the database is also recorded by the backup application so that the backed up data may be identified during restoration. The information from the database may be distributed throughout the backup or may be recorded separately at the beginning or end of the backup, for example. Since this is the only data that need be backed up to keep an up to date backup copy and since typical users only modify very small parts or areas of a file, it will be appreciated that this backup copy will be significantly smaller than a backup comprising all the data in each file that has been modified.

Three alternative embodiments which do not require a dedicated backup application program are described below.

Conventional backup applications are arranged to backup a complete file. In the first of the three alternatives, a modification file is created and stored on the hard disk 16. This file contains the database information and the data stored in the file areas referred to in the database. A conventional backup application is then caused to backup the modification file and in so doing, backs up sufficient information to enable modifications made since the last backup to be restored.

The two further alternatives are based around a phantom or simulated file.

In the second alternative, before the backup application is caused to backup the modification file as described above, a simulated or phantom file is created which has the same size as that of the modification file were it to be created. No useful data is stored in this file and its purpose is to provide an entry in the directory structure which can be interrogated by the backup application. By causing the backup application to attempt to backup this phantom file, the application will generate a series of read requests which can be intercepted at the operating system interface level as described above.

Figure 5:
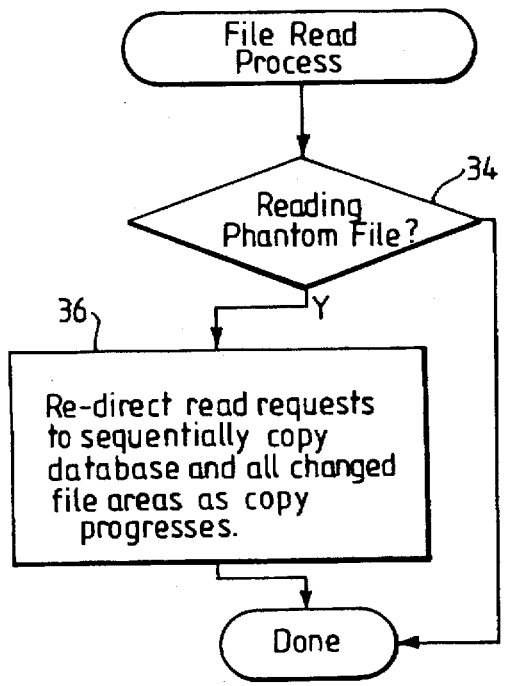
FIG. 5 is a flowchart of a backup process in accordance with a second embodiment of the invention.

With reference to FIG. 5, in step 34, each read request is intercepted to check whether an attempt to read from the phantom file is being made and if so, the requested data is redirected in real-time. The redirection operation is performed in step 36. In this step, the backup application is not fed data from the phantom file but is instead fed redirected data which corresponds to that that would be read from the position in the modification file which corresponds to the requested position in the phantom file; i.e. it is fed the database information and the modified file areas. In this way, although disk space is taken up by the phantom file (which contains redundant data) the time taken to create and subsequently read the modification file is saved.

Figure 6:
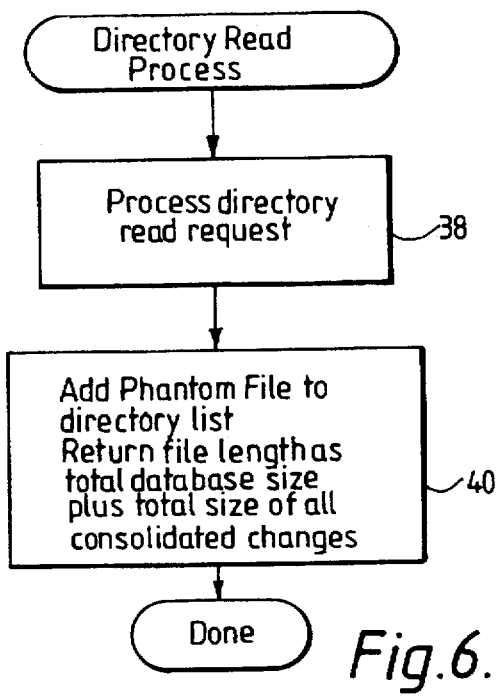
FIG. 6 is a flowchart of a backup process in accordance with a third embodiment of the invention.

In the third alternative embodiment, no phantom file is created on the hard disk 16. With reference to FIG. 6, instead of creating a phantom file to provide an entry in the directory structure, the directory read request generated by the backup application is intercepted (step 38) in the same manner as the file read and write requests. In step 40, information relating to a non-existent phantom file is added to the directory list returned by the operating system to the backup application. By intercepting file open and file read requests at the operating system interface level, the remainder of the backup procedure proceeds as described above for the second alternative. In this way, the waste of disk space caused by the creation of a phantom file containing redundant data is avoided.

In order to restore the backed up data, a modification data file that has previously been backed up is read. The database is thereby extracted to identify which areas of which files are contained in the modification file. The respective areas on the hard disk 16 may then all or selectively be overwritten with the backed up data.

It will be appreciated that the embodiments described above may form an integral part of a backup application and/or an operating system.

I claim:

1. A method of operating a microprocessor-based computer system including a random access memory, a central processing unit, and storage means, the method comprising the step of:

providing instructions stored in the memory to the central processing unit to cause said central processing unit to write data to at least one file stored in the storage means by generating a write request, extracting information for a modification data set from each said write request, and building a database containing at least one said modification data set, wherein the write request comprises said modification data set which identifies a region of said file modified by said write request, and wherein the modification data set includes identification means for identifying said file, a starting position in said file and a length value corresponding to the quantity of data to be written to said file.

2. The method of claim 1, further comprising the step of analysing a plurality of said modification data sets in said database and for each group of modification data sets relating to overlapping or contiguous write requests to replace each said group with a single respective new modification data set.

3. The method of claim 1, further comprising the step of interrogating the database to establish which regions of which files have been modified.

4. The method of claim 1, further comprising the step of creating a backup copy by backing up data stored in said storage means using information from said database to indicate which data to backup.

5. The method of claim 4 wherein the step of creating said backup copy comprises the steps of:

creating a modification file containing said modification data set or sets from said database and the region of each file identified by each respective set, storing said modification file on said storage means, and instructing a backup application program to make a backup copy of said modification file.

6. The method of claim 5 comprising the steps of:

reading a modification data set from said modification file, reading said respective region from said modification file, and writing said region to the file specified in said modification data set.

7. The method of claim 4, wherein the step of creating said backup copy comprises the steps of:

generating a phantom file, monitoring read requests generated by the backup operation, and responding to each said read request which corresponds to said phantom file by redirecting the read operation in real time to data identified in said data set or sets in said database.

8. The method of claim 7, further comprising the step of monitoring directory read requests from the backup application and adding details of said modification file to the information returned by the operating system in response to each said directory read request.

9. The method of claim 7, further comprising the step of creating a file containing redundant data having a size corresponding to the expected size of said modification file.

10. The method of claim 1, wherein the method is performed as an integral part of the operation of a backup application program.

11. The method of claim 1, wherein the method is performed as an integral part of the operation of a computer operating system.

12. A microprocessor-based computer system including a random access memory, a central processing unit, and storage means, the system comprising means for providing instructions stored in said memory to said central processing unit to cause said central processing unit to write data to at least one file stored in the storage means by generating a write request, means for extracting information for a modification data set from each said write request, and means for building a database containing at least one said modification data set.

wherein the write request comprises said modification data set which identifies a region of said file modified by said write request, and wherein the modification data set includes identification means for identifying said file, a starting position in said file and a length value corresponding to the quantity of data to be written to said file.

13. The system of claim 12, further comprising means for analysing a plurality of said modification data sets in said database and for each group of modification data sets relating to overlapping or contiguous write requests to replace each said group with a single respective new modification data set.

14. The system of claim 12, further comprising means for interrogating the database to establish which regions of which files have been modified.

15. The system of claim 12, further comprising means for creating a backup copy by backing up data stored in said storage means using information from said database to indicate which data to backup.

16. The system of claim 15, wherein the means for creating said backup copy comprises means for:

creating a modification file containing said modification data set or sets from said database and the region of each file identified by each respective set, storing said modification file on said storage means, and instructing a backup application program to make a backup copy of said modification file.

17. The system of claim 16 comprising means for:

reading a modification data set from said modification file, reading said respective region from said modification file, and writing said region to the file specified in said modification data set.

18. The system of claim 15, wherein said means for creating said backup copy comprises:

means for generating a phantom file, means for monitoring read request generated by said backup operation, and means for responding to each said read request which corresponds to said phantom file by redirecting the read operation in real time to data identified in said data set or sets in said database.

19. The system of claim 18, further comprising means for monitoring directory read request from the backup application and adding details of said modification file to the information returned by the operating system in response to each said directory and request.

20. The system of claim 18, further comprising means for creating a file containing redundant data having a size corresponding to the expected size of said modification file.

21. The system of claim 12, wherein the system forms an integral part of the operation of a backup application program.

22. The system of claim 12, wherein the system forms an integral part of the operation of a computer operating system.

23. A method of operating a microprocessor-based computer system including a random access memory, a central processing unit, and a storage means, the method comprising the steps of:

providing an auxiliary database containing modification data sets which identify regions of a files on the storage means that have been modified by a write request, each modification data set including identification means for identifying a starting position in the file, and a length value corresponding to the quantity of data to be written to the file; and providing instructions stored in the random access memory to the central processing unit to command the following operations:

interrogating the auxiliary database to establish which regions of the file have been modified; and creating a backup copy by backing up data stored in the storage means, using information from the auxiliary database to indicate which data to backup.

24. Apparatus for operating a microprocessor-based computer system which includes a random access memory, a central processing unit, and a storage means, an auxiliary database containing modification data sets which identify regions of a file on the storage means that have been modified by a write request, each modification data set including identification means for identifying a starting position in the file, and a length value corresponding to the quantity of data to be written to the file;

means for providing instructions, stored in the random access memory, to the central processing unity means for interrogating the auxiliary database to establish which regions of the file have been modified; and means for creating a backup copy by backing up data stored in the storage means, using information from the auxiliary database to indicate which data to backup.

25. A method of accessing data in a microprocessor-based computer system including a random access memory, a central processing unit, a main storage means, and a backup storage means, the method comprising the steps of:

providing an auxiliary database containing modification data sets which identify regions of a file on the storage means that have been modified, each modification data set including identification means for identifying a starting position in the file, and a length value corresponding to the quantity of data to be written to the file;

providing a modification data file containing regions of the file identified by each modification data set; and providing instructions stored in the random access memory to the central processing unit to command the following operations:

interrogating the auxiliary database to establish which regions of the file have been modified; and restoring data from the modification data file to the main storage means using information from the auxiliary database to indicate which data to restore.

26. Apparatus for accessing data in a microprocessor-based computer system including a random access memory, a central processing unit, a main storage means, and a backup storage means, comprising:

an auxiliary database containing modification data sets which identify regions of a file on the storage means that have been modified, each modification data set including identification means for identifying a starting position in the file, and a length value corresponding to the quantity of data to be written to the file;

a modification data file containing regions of the file identified by each modification data set;

means for providing instructions stored in the random access memory to the central processing unit;

means for interrogating the auxiliary database to establish which regions of the file have been modified; and means for restoring data from the modification data file to the main storage means using information from the auxiliary database to indicate which data to restore.

27. A method of operating a microprocessor-based computer system including a random access memory, a central processing unit, and storage means, the method comprising the step of:

providing instructions stored in the memory to the central processing unit to cause said central processing unit to write data to at least one file stored in the storage means by generating a write request.

extracting information for a modification data set from each said write request, and building a database containing at least one said modification data set, wherein the write request comprises said modification data set which identifies a region of said file modified by said write request, and wherein the modification data set includes identifications means for identifying said file, and a position identifier for said file corresponding to the quantity of data to be written to said file.

28. A microprocessor-based computer system including a random access memory, a central processing unit, and storage means, the system comprising means for providing instructions stored in said memory to said central processing unit to cause said central processing unit to write data to at least one file stored in the storage means by generating a write request, means for extracting information for a modification data set from each said write request, and means for building a database containing at least one said modification dasta set, wherein the write request comprises said modification data set which identifies a region of said file modified by said write request, and wherein the modification data set includes identification means for identifying said file, and a position identifier for said file corresponding to the quantity of data to be written to said file.

29. A method of operating a microprocessor-based computer system including a random access memory, a central processing unit, and a storage means, the method comprising the steps of:

providing an auxiliary database containing modification data sets which identify regions of a file on the storage means that have been modified by a write request, each modification data set including identification means for identifying a position identifier for the file, corresponding to the quantity of data to be written to the file; and providing instructions stored in the random access memory to the central processing unit to command the following operations:

interrogating the auxiliary database to establish which regions of the file have been modified; and creating a backup copy by backing up data stored in the storage means, using information from the auxiliary database to indicate which data to backup.

30. Apparatus for operating a microprocessor-based computer system which includes a random access memory, a central processing unit, and a storage means, comprising:

an auxiliary database containing modification data sets which identify regions of a file on the storage means that have been modified by a write request, each modification data set including identification means for identifying a position identifier for the file, corresponding to the quantity of data to be written to the file, means for providing instructions, stored in the random access memory, to the central processing unit;

means for interrogating the auxiliary database to establish which regions of the file have been modified; and means for creating a backup copy by backing up data stored in the storage means, using information from the auxiliary database to indicate which data to backup.

31. A method of accessing data in a microprocessor-based computer system including a random access memory, a central processing unit, a main storage means, and a backup storage means, the method comprising the steps of:

providing an auxiliary database containing modification data set which identify regions of a file on the storage means that have been modified, each modification data set including identification means for identifying a position identifier for the file corresponding to the quantity of data to be written to the file;

providing a modification data file containing regions of the file identified by each modification data set; and providing instructions stored in the random access memory to the central processing unit to command the following operations:

interrogating the auxiliary database to establish which regions of the file have been modified; and restoring data from the modification data file to the main storage means using information from the auxiliary database to indicate which data to restore.

32. Apparatus for accessing data in a microprocessor-based computer system including a random access memory, a central processing unit, a main storage means, and a backup storage means, comprising:

an auxiliary database containing modification data sets which identify regions of a file on the storage means that have been modified, each modification data set including identification means for identifying a position identifier for the file corresponding to the quantity of data to be written to the file;

a modification data file containing regions of the file identified by each modification data set;

means for providing instructions stored in the random access memory to the central processing unit;

means for interrogating the auxiliary database to establish which regions of the file have been modified; and means for restoring data from the modification data file to the main storage means using information from the auxiliary database to indicate which data to restore.

\* \* \* \* \*